US007299351B2

(12) United States Patent
Huitema et al.

(10) Patent No.: US 7,299,351 B2
(45) Date of Patent: Nov. 20, 2007

(54) PEER-TO-PEER NAME RESOLUTION PROTOCOL (PNRP) SECURITY INFRASTRUCTURE AND METHOD

(75) Inventors: Christian Huitema, Clyde Hill, WA (US); John L. Miller, Bellevue, WA (US); Alexandru Gavrilescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1270 days.

(21) Appl. No.: 09/956,260

(22) Filed: Sep. 19, 2001

(65) Prior Publication Data

US 2003/0056094 A1    Mar. 20, 2003

(51) Int. Cl.
*H04L 9/00* (2006.01)
(52) U.S. Cl. ..................................................... 713/156
(58) Field of Classification Search ........ 713/155–158; 726/5, 18, 19; 380/277, 285
See application file for complete search history.

(56) References Cited

U.S. PATENT DOCUMENTS

| 5,371,794 | A | * | 12/1994 | Diffie et al. ................ 713/156 |
| 5,901,227 | A | * | 5/1999 | Perlman ..................... 713/157 |
| 5,922,074 | A | * | 7/1999 | Richard et al. .............. 726/21 |
| 5,982,898 | A | * | 11/1999 | Hsu et al. ................... 713/156 |
| 5,987,376 | A | | 11/1999 | Olson et al. |
| 6,044,350 | A | * | 3/2000 | Weiant et al. ................. 705/1 |
| 6,085,320 | A | * | 7/2000 | Kaliski, Jr. ................. 713/168 |
| 6,088,805 | A | * | 7/2000 | Davis et al. ................ 713/202 |
| 6,097,811 | A | * | 8/2000 | Micali ........................ 713/186 |
| 6,128,740 | A | * | 10/2000 | Curry et al. ................ 713/158 |
| 6,134,658 | A | * | 10/2000 | Multerer et al. ............ 713/175 |
| 6,754,829 | B1 | * | 6/2004 | Butt et al. ..................... 726/8 |
| 6,775,782 | B1 | * | 8/2004 | Buros et al. ................... 726/2 |
| 6,912,622 | B2 | | 6/2005 | Miller |
| 7,130,999 | B2 | * | 10/2006 | Yasala et al. ............... 713/157 |
| 2002/0143989 | A1 | | 10/2002 | Huitema et al. |

OTHER PUBLICATIONS

U.S. Appl. No. 09/942,164, Huitema et al.

(Continued)

*Primary Examiner*—Kambiz Zand
*Assistant Examiner*—Thomas M Ho
(74) *Attorney, Agent, or Firm*—Marshall, Gerstein & Borun LLP (57) ABSTRACT

A method for use in a peer-to-peer communication system to ensure valid connections are made in a secure manner includes the steps of receiving an address record for a peer node which includes an ID certificate. The ID certificate is validated and checked to verify that the ID certificate has not expired. Further, the method determines if the node from whom the address record was received is to be trusted, and the number of instances of the IP address included in the certificate is already stored in cache. When the foregoing are completed successfully, i.e. the certificate is valid, not expired, has been supplied by a trusted neighbor, and does not point to an IP address that already exists for different ID's multiple times, the method opportunistically verifies ownership of the ID certificate at the peer node's IP address. That is, the verification of ownership only occurs when the advertiser of the ID is the owner of that ID (or when the ID is to be used). If any of the above cannot be completed successfully, the address record is discarded.

24 Claims, 4 Drawing Sheets

OTHER PUBLICATIONS

Microsoft.com, *Peer-To-Peer Common Documentation*, http://msdn.microsoft.com/library/default.asp?url=/library/en-us/p2psdk/p2p/peer_to_common_documentation.asp, (last vistited Aug. 5, 2005).

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

* cited by examiner

PEER-TO-PEER NAME RESOLUTION PROTOCOL (PNRP) SECURITY INFRASTRUCTURE AND METHOD

FIELD OF THE INVENTION

The present invention relates generally to peer-to-peer protocols, and more particularly to security framework infrastructures for to peer-to-peer protocols.

BACKGROUND OF THE INVENTION

Peer-to-peer communication, and in fact all types of communication, depend on the possibility of establishing valid connections between selected entities. However, entities may have one or several addresses that may vary because the entities move in the network, because the topology changes, or because an address lease cannot be renewed. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their address through various mechanisms. Some protocols also allow a client to acquire knowledge of other entities' addresses through the processing of requests from others in the network. Indeed, it is this acquisition of address knowledge that enables successful operation of these peer-to-peer networks. That is, the better the information about other peers in the network, the greater the likelihood that a search for a particular resource will converge.

However, without a robust security infrastructure underlying the peer-to-peer protocol, malicious entities can easily disrupt the ability for such peer-to-peer systems to converge. Such disruptions may be caused, for example, by an entity that engages in identity theft. In such an identity theft attack on the peer-to-peer network, a malicious node publishes address information for IDs with which it does not have an authorized relationship, i.e. it is neither the owner nor a group member, etc. A malicious entity could also flood the network with bad information so that other entities in the network would tend to forward requests to non-existent nodes (which would adversely affect the convergence of searches), or to nodes controlled by the attacker.

While validation of an address certificate may prevent the identity theft problem, such is ineffective against this second type of attack. An attacker can continue to generate verifiable address certificates (or have them pre-generated) and flood the corresponding IDs in the peer-to-peer cloud. If any of the nodes attempts to verify ownership of the ID, the attacker would be able to verify that it is the owner for the flooded IDs because, in fact, it is. However, if the attacker manages to generate enough IDs it can bring most of the peer-to-peer searches to one of the nodes controlled by him. At this point the attacker can fairly well control and direct the operation of the network.

If the peer-to-peer protocol requires that all new address information first be verified to prevent the identity theft problem discussed above, a third type of attack becomes available to malicious entities. This attack to which these types of peer-to-peer networks are susceptible is a form of a denial of service (DoS) attack. If all the nodes that learn about new records try to perform the ID ownership check, a storm of network activity against the advertised ID owner will occur. Exploiting this weakness, an attacker could mount an IP DoS attack against a certain target. For example, if a malicious entity advertises Microsoft's Web IP address as the ID's IP, all the nodes in the peer-to-peer network that receive this advertised IP will try to connect to that IP (Microsoft's Web server's IP) to verify the authenticity of the record. Of course Microsoft's server will not be able to verify ownership of the ID because the attacker generated this information. However, the damage has already been done. That is, the attacker just managed to convince a good part of the peer-to-peer community to attack Microsoft.

A malicious entity could also attempt to disrupt the operation of the peer-to-peer network by trying to ensure that searches will not converge. Specifically, an attacker could attempt to affect the effectiveness of the search algorithm used by the peer-to-peer protocol to implement a sort of DoS attack for searches. For example, instead of forwarding the search to a node in its cache that is closer to the ID to aid in the convergence of the search, it could forward the search to a node that is further away from the requested ID. Alternatively, the malicious entity could simply not respond to the search request at all.

BRIEF SUMMARY OF THE INVENTION

The inventive concepts disclosed in this application involve a new and improved method for ensuring valid and secure peer-to-peer communications. Specifically, the system of the present invention presents a method of ensuring secure peer-to-peer communication by validating identification (ID) certificates for a peer node's IP address before use in a peer-to-peer name resolution protocol (PNRP). This method comprises the steps of validating the ID certificate and opportunistically verifying ownership of the ID certificate at the peer node's IP address. The validation of the ID certificate comprises obtaining a public key $P_{ID}$ of the peer node, hashing the $P_{ID}$, and verifying that the hash of the $P_{ID}$ equals an identity of the peer node contained in the ID certificate.

In an embodiment, the method further includes checking an expiration date of the ID certificate to determine if the ID certificate is still valid. Still further, the method checks a trustworthiness metric of a peer from whom the ID certificate was received to determine if the information is to be trusted. Additionally, the method checks a cache to determine if a number of entries that point to the IP address of the ID certificate is below a predetermined limit. In an a further embodiment, when the method determines that a peer from whom the ID certificate was received is not an owner of the ID certificate, it stores the ID certificate in a cache along with an identification of the peer from whom the ID certificate was received.

In a preferred embodiment of the method of the present invention, the step of opportunistically verifying ownership of the ID certificate at the peer node's IP address comprises the steps of determining that a peer from whom the ID certificate was received is an owner of the ID certificate, encrypting a challenge with $P_{ID}$ to form an encrypted challenge, sending the encrypted challenge to the IP address of the ID certificate, and receiving the challenge in decrypted form from the peer node. If the advertiser of the ID certificate is not the owner, no ownership check is performed (until the peer-to-peer node needs to use the ID certificate). When information from a node is verified, the method of the present invention increments a trustworthiness metric for that node. If information from a node cannot be verified, the method of the present invention decrements the trustworthiness metric for that node.

In an alternate embodiment of the present invention, a secure method of processing peer-to-peer queries comprises the steps of receiving the query from a neighbor and checking to see if a valid and verified record of the neighbor is stored in cache. When a valid and verified record of the neighbor is not stored in cache, the method validates the ID certificate of the neighbor, and selectively verifies ownership of the ID certificate at an IP address of the neighbor. When the neighbor is not an originator of the query, the method validates an ID certificate of the originator. If the method's identity satisfies the query, the method returns the local identity certificate to the neighbor However, when the local identity does not satisfy the query, the method forwards the query to another peer.

In one embodiment of the present invention, the method forwards the query to another peer by searching the cache to find a record for a suitable peer to which to forward the query and determining if authentication of the record is valid. When authentication of the record is not valid, the method performs authentication of record. Additionally, when the authentication of the record is not successful the method searches for a new peer to which to forward the query, and repeats the validation for that new peer.

In an alternate embodiment of the present invention, a secure method of processing peer-to-peer responses from queries comprises the steps of receiving the result from a query from a neighbor and checking to see if a valid and verified record of the neighbor is stored in cache. When a valid and verified record of the neighbor is not stored in cache, the method validates an ID certificate of the neighbor, and opportunistically verifies ownership of the ID certificate at an IP address of the neighbor. When the neighbor is not the result of the query, the method validates an ID certificate of the result. Finally, when the ID certificate of the result is validated, the method forwards the result to a next hop identified in the result.

A peer-to-peer node address certificate constructed in accordance with the present invention comprises a first data field containing a certificate version, a second data field containing a peer node identifier, a third data field containing information associated with the peer node identifier, a fourth data field containing information relating to a period of validity for the address certificate, and a fifth data field containing a public key of the node. Preferably, the information associated with the peer node identifier comprises an address tuple of the node, and an address tuple of a neighbor that advertised the certificate. In an alternate embodiment, the peer-to-peer node address certificate also includes a sixth data field containing a certificate revocation flag.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
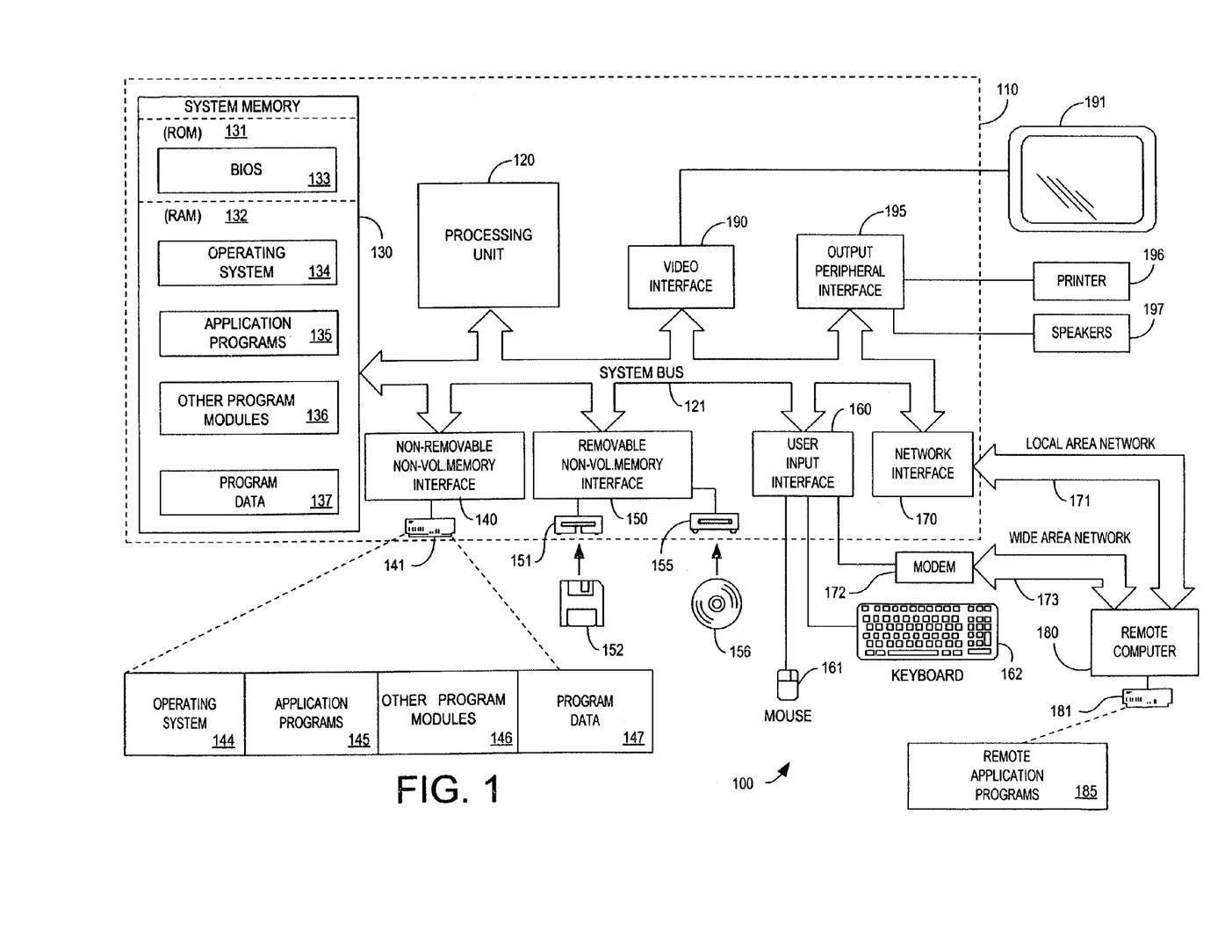
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Because a particular user may connect to the network in various ways at various locations having different addresses, a preferred approach is to assign a unique identity to the user, and then resolve that identity to a particular address through the protocol. Such a peer-to-peer name resolution protocol (PNRP) to which the security infrastructure of the instant invention finds particular applicability is described in co-pending application Ser. No. 09/942,164, entitled Peer-To-Peer Name Resolution Protocol (PNRP) And Multilevel Cache For Use Therewith, filed on Aug. 29, 2001, the teachings and disclosure of which are hereby incorporated in their entireties by reference thereto. However, one skilled in the art will recognize from the following teachings that the security infrastructure and methods of the present invention are not limited to the particular peer-to-peer protocol of this co-pending application, but may be applied to other protocols with equal force.

As discussed in the above-incorporated co-pending application, establishing peering relations is an expensive process in existing peer-to-peer networks. However, to improve the response rate the number of associations per peer is increased by allowing peers spontaneously to build relations. However, arrival of new information, through the results of queries and flooding, may in fact drown the useful knowledge in useless noise. In the PNRP each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. This will always be the case as long as the number of entries has not reached the size limit. When the limit is reached, any new entry will replace an existing entry; there are several implementations strategies, such as trying to find well spaced entries in the name space, trying to select entries that are in close proximity to the local node, or simply selecting at random an existing entry to be replaced. This way, the routing table will always be refreshed to contain active neighbors. The replacement mechanism does not affect the direct neighbors. These neighbor entries are created when the graph is set up. This restriction is used in one embodiment in order to maintain some degree of connectivity. In a preferred embodiment, the replacement strategy is random in each cache level, rather than based on a utility measure. Each entry has an 'ideal cache level' $0$ determined by its 'distance' from the cache owner. New entries may only be added to the cache level corresponding to their distance, or to the lowest level if the entry's 'ideal cache level' has not been breached yet.

In PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

To allow this protocol to operate properly with valid information, the present invention presents an underlying security infrastructure that utilizes an underlying trust model. In this model, it is preferably assumed that private-public key encoding is trusted. That is, it is trusted that for one public key there is one and only one private key that can be used to perform the reverse cryptographic operation. Also, private-public key unique generation is trusted. That is, the algorithm for generating private-public keys is trusted to produce unique key pairings every time it is run. In one embodiment of the present invention, neighbors that sent good records before are trusted to send good records in the future. Further, in another embodiment of the invention licensed software is trusted. That is, nodes that are running licensed software are trusted to implement the PNRP algorithms or other P2P algorithms and implement the security infrastructure of the present invention.

In view of this trust model, a preferred embodiment of the present invention computes the entity's identity (ID) as a 128-bit hash of the public key of a self-generated RSA key pair. The public key used to generate the ID can also be the public key of one of the X.509 certificates that a peer owns. Other methods of unique ID generation may be used as appropriate, provided that they are able to scale to the desired network size while still ensuring global uniqueness of the ID. In one embodiment of the invention, the uniqueness of the identity is ensured by the algorithm that generates the asymmetric key pairs.

As with many successful P2P protocols, entities can be published for easy discovery. To provide security and integrity to the P2P protocol, however, each identity preferably includes an attached identity certificate. The keeper of the ID private key uses the certificate to attach additional information to the ID, such as the IP address, friendly name, etc. Preferably, each node generates its own pair of private-public keys, although such may be provided by a trusted supplier. The public key is then included as part of the node identifier. Only the node that created the pair of keys has the private key with which it can prove that it is the creator of the node identity. In this way, identity theft may be discovered, and is, therefore, deterred.

A generic format for such certificates may be represented as [Version, ID, <ID Related Info>, Validity, Algorithms, $P_{Issuer}]K_{Issuer}$. As used in this certificate representation, Version is the certificate version, ID is the identifier to be published, <ID Related Info> represents information to be associated with the ID, Validity represents the period of validity expressed in a pair of From-To dates expressed as Universal Date Time (aka GMT), Algorithms refers to the algorithms used for generating the key pairs, and for signing, and $P_{Issuer}$ is the public key of the certificate issuer. If the certificate issuer is the same as the ID owner then this is $P_{ID}$ the public key of the ID owner. The term $K_{Issuer}$ is the private key pair of $P_{Issuer}$. If the certificate issuer is the ID owner then this is $K_{ID}$, the private key of the ID owner.

In a preferred embodiment, the <ID related info> comprises the address tuple where this ID can be found, and the address tuple for the PNRP service of the issuer. In this embodiment, the address certificate becomes [Version, ID, <Address>$_{ID}$, <Address>$_{PNRP}$, Validity, Revoke Flag, Algorithms, $P_{Issuer}]K_{Issuer}$. In this expanded representation, the ID is the identifier to be published, which can be a Group ID or Peer ID. The <Address> is the tuple of IPv6 address, port, and protocol. <Address>$_{ID}$ is the address tuple to be associated with the ID. <Address>$_{PNRP}$ is the address tuple of the PNRP service (or other P2P service) on the issuer machine. This is preferably the address of the PNRP address of the issuer. It will be used by the other PNRP nodes to verify the validity of the certificate. Validity is the period of validity expressed in a pair of From-To dates. The Revoke Flag, when set, marks a revocation certificate. The $P_{Issuer}$ is the public key of the certificate issuer, and the $K_{Issuer}$ is the private key pair of $P_{Issuer}$. If the certificate issuer is the ID owner then this is $K_{ID}$, the private key of the ID.

In a preferred embodiment of the present invention, the following conditions have to be met for a certificate to be valid. The certificate signature must valid, and the certificate cannot be expired. That is, the current date expressed as UDT must be in the range specified by the Validity field. The node has to check if it does not have a revocation certificate matching the current certificate in its cache. The hash of the public key must also match the ID. If the Issuer is the same as the ID owner then the hashing of the issuer's public key into the ID has to verify (i.e. ID=hash($P_{ID}$)). If the $P_{Issuer}$ is different from $P_{ID}$ then there must be a chain of certificates leading to a certificate signed with $K_{ID}$. Such a chain verifies the relationship between the issuer and the ID owner. Additionally, in the case when a certification revocation list (CRL) is published for that class of IDs and the CRL is accessible, then the authenticator can verify that none of the certificates in the chain appear in the CRL.

As discussed above, identity theft can be discovered by simple validation of the address certificate before using that address in PNRP or other P2P protocols. This validation may entail simply verifying that the ID is the hash of the public key included in the certificate. The ownership validation may also entail the issuance of a challenge to the entity using the public key, and ensuring that the entity can return a proper response (by decrypting the challenge with the private key pair). However, recognizing that this simple validation of ID ownership cannot protect against a malicious entity that floods the network with bad records by generating a plurality of key pairs, the system of the present invention also limits the number of records held in its cache that lead to the same IP address. In this way, an entity's cache cannot be swamped by records that all lead to the same malicious entity, even though the entity can verify its ownership of the records.

Also recognizing that conducting ownership validation through the issuance of an encrypted challenge to the IP address contained in the certificate can result in a DoS attack on an unsuspecting sever perpetrated by innocent entities in the peer-to-peer network, the security infrastructure of the present invention limits the number of such ID ownership checks by distributing them to multiple nodes. For example, when a new record is flooded to multiple nodes, instead of having every node that learns about the new record check the ID ownership, every node simply checks the trustworthiness of the advertiser of the new record. The determination of the trustworthiness of the advertiser will be described more fully below. The protection against a malicious entity that attempts to affect the search algorithm by forwarding a search request to a node that is further from the sought ID or by not forwarding the request at all is provided by the PNRP of a preferred embodiment due to the randomizing of the hops to which it sends name resolution queries. Thus, if a node runs this malicious code, the randomizing of the querying process will ensure that at least some of the have a chance to avoid the infested node.

When the system of the present invention determines that ID ownership verification is appropriate, the node (N) verifies that the contact advertised with the ID as the ID owner (O) has the private key that pairs with the public key from which the ID was hashed. To accomplish this, N obtains the public key of the ID, for example by asking O, by looking it up in a public key directory, or by using the public key contained in the ID certificate. N then hashes the public key and verifies that the ID matches the one to be published. Once this verification is complete, N verifies that O is the holder of the private key. To do this, N sends to O a challenge encrypted with O's public key. As indicated briefly above, O decrypts the challenge with the private key and sends back to N the challenge.

As described more fully in the above referenced co-pending application, a PNRP node N learns about a new ID in one of four ways. It may learn of a new ID through the initial flooding of a neighbor's cache. Specifically, when a P2P node comes up it contacts another node member of the P2P cloud and initiates a cache synchronization sequence. It may also learn of a new ID as a result of a neighbor flooding a new record of its lowest cache. For example, assume that node N appears as an entry in the lowest level cache of node M. When M learns about a new ID, if the ID fits in its lowest level cache, it will flood it to the other entries in that cache level, respectively to N. A node may also learn of a new ID as a result of a search request. The originator of a search request inserts its address certificate in the request. In this way, all of the nodes along the search request path will update their cache with the search originator's address. Similarly, a node may learn of a new ID as a result of a search response. The result of a search request travels a subset of the request path in reversed order. The nodes along this path update their cache with the search result.

Maintaining a well-formed and valid cache is key to making PNRP work. An entry in the cache is presumed valid if it passes two checks. These checks are an address certificate validation, which verifies that the information that was originally published has not been tampered with and that the owner of the private key is the one that published this information, and an ID ownership check, which verifies that the private key of the publisher resides at the published address. As discussed herein, an ID ownership check is expensive and it can trigger network storms. Also address certificate validation gets expensive in terms of amount of data that needs to be passed when the full certificate chain has to be verified.

Therefore, to avoid the attacks mentioned above the system of the present invention implements a security infrastructure that combines the following methods: address certificate validation without membership certificates chain verification; full address certificate validation; opportunistic ID ownership check (this check is limited to the nodes that are in contact directly with the ID publisher, the rest of the nodes then simply trust them); measure the neighbors trustworthiness based on past records; and limit the number of records pointing to the same IP address to a percentage of the size of the cache.

Before adding an address certificate to the cache a node verifies that the certificate signature is valid and the certificate is not expired, that the number of occurrences of the same IP address in the cache does not exceed the maximum limit, and that the certificate is not advertised by an untrusted neighbor. These initial checks are illustrated in the simplified flow diagram of FIG. 2. Specifically, after initialization 200 and the node obtains a new record 202, the ID certificate is validated 204 as discussed above. If it is determined that the ID certificate is not valid 206, the security infrastructure prevents this record from being added to the cache, the trustworthiness metric 214 for the neighbor is decremented 238, and the process ends 240. However, even in the ID certificate is valid, the system of the present invention next checks the ID certificate expiration date 208 to see if the record is stale. If the date is no longer valid 210, the system does not add the record to the cache, the trustworthiness metric 214 for the neighbor is decremented 238, and the process ends 240.

Figure 2:
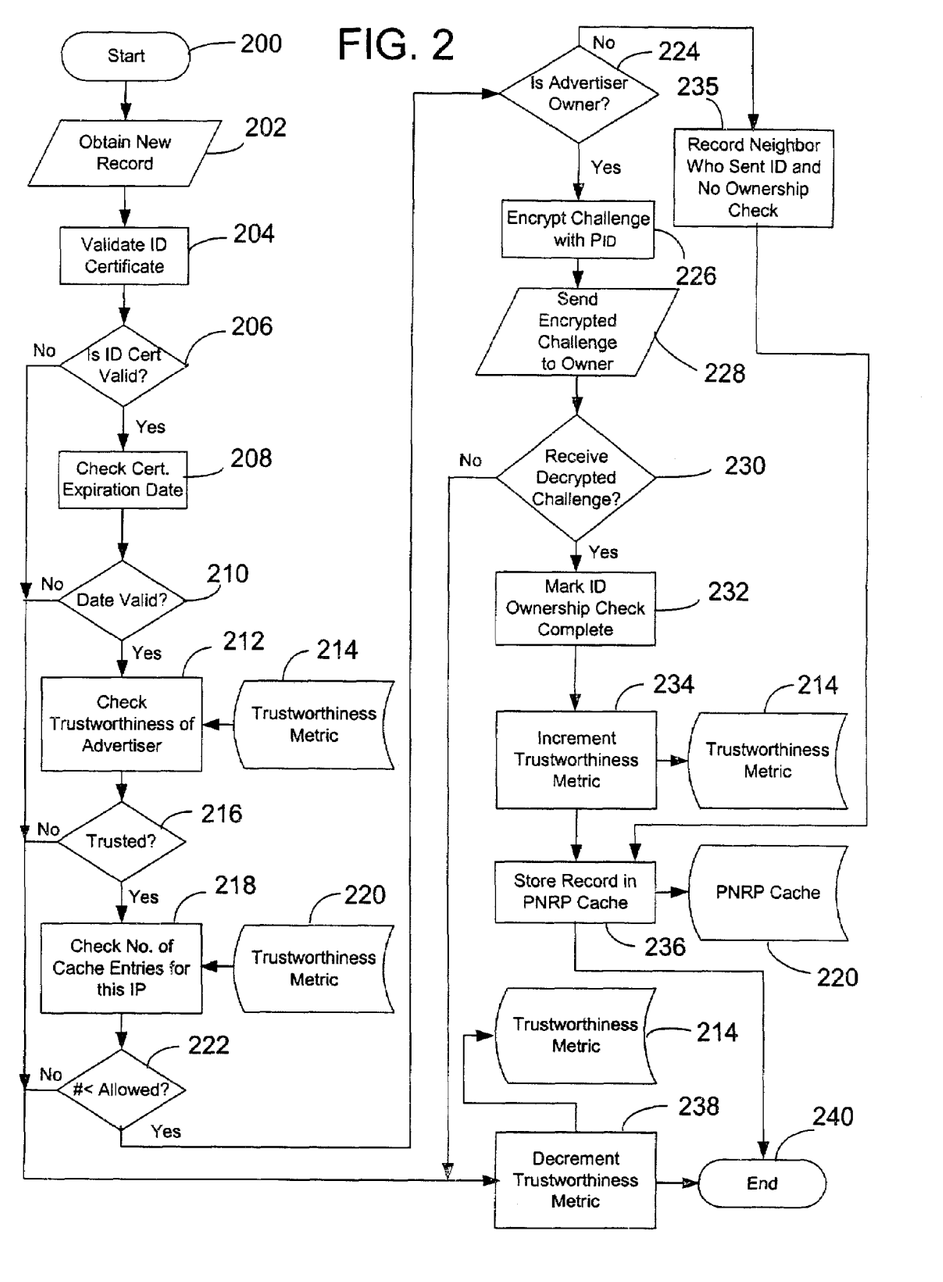
FIG. 2 is a simplified flow diagram illustrating an aspect of the present invention.

If the date is valid 210, the trustworthiness of the advertiser of the record is checked 212 by accessing the trustworthiness metric 214 for that advertiser. If the advertiser is not trusted 216, the record is not added to the cache, the trustworthiness metric 214 for the neighbor is decremented 238, and the process ends 240. Even if the advertiser is trusted 216, the cache 220 is checked 218 to determine if the number of records that point to the same IP address exceeds that which is allowed. If there are too many records that point to the same IP address 222, then the trustworthiness metric 214 for the neighbor is decremented 238 and the process ends 240 without adding this record to the cache. However, if there are not too many records that lead to the same IP address 222, then the record may be added, pending determination of the following.

For address certificates for which the neighbor is the issuer, the full membership certificate chain is verified and the ID ownership check is performed. If any of these checks fail, the new record is not added to the cache. That is, for records that are advertised by their owner 224, a full ownership check (steps 226-230) is performed. A challenge is encrypted with $P_{ID}$ 226 and sent to the owner of the record 228. If the decrypted challenge is not received from the purported owner 230, the record deemed spoofed, and therefore not added to the cache and the process ends 240. If the advertiser is indeed the owner, it decrypts the challenge and sends it back to the node 230. At this point the node marks that the ID ownership has been performed 232 (for later use), and increments 234 the trustworthiness metric 214 for the advertiser/owner of the record. The record is then stored in the cache 220 at step 236.

A node performs an ID ownership check only for the records signed by the neighbor, but not for all the records the neighbor floods. Such check is done selectively, only when the record is used. That is, if the advertiser (neighbor) is not the owner of the record 224, the advertiser (neighbor) is recorded with the record 235, and the record is stored 236 in the cache 220. This additional information stored with the record will be used if it later turns out that the record is bad. That is, the advertiser's trustworthiness metric will be decremented if and when it is determined that it provided a bad record.

Before talking to a neighbor, however, the node performs a neighbor authentication if it has never performed one before, or if the time since it did such an authentication is too far in the past. A BYE message would help to keep the cache clean. It would also avoid false advertisements that would affect our trustworthiness. The neighbor authentication preferably includes full address certificate validation and ID ownership check. To aid in these processes, every record in the cache includes the ID address certificate, the time that the ID ownership check was performed, the ID of the neighbor from which it learned this ID, and the trustworthiness of this ID.

Figure 3:
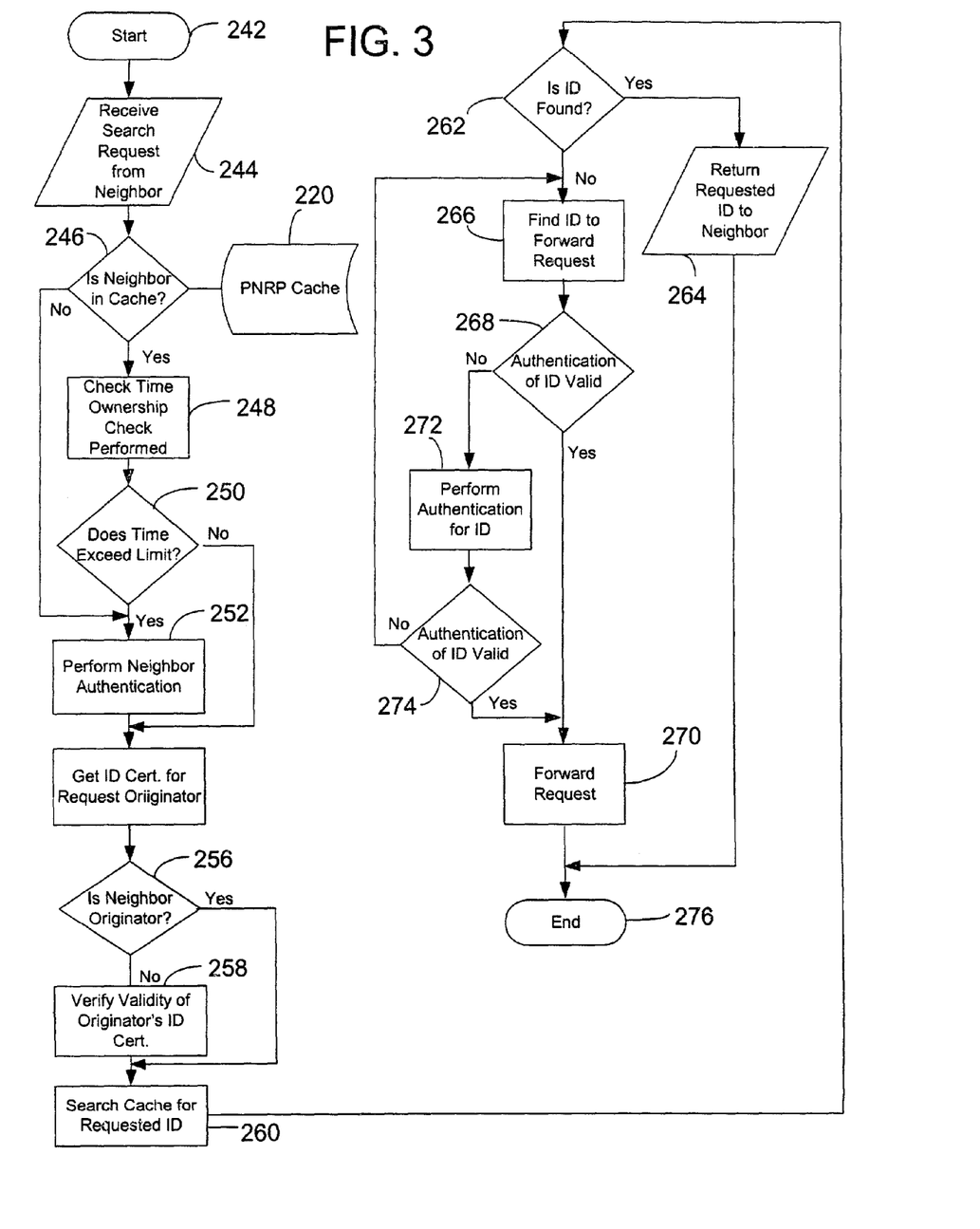
FIG. 3 is a simplified flow diagram illustrating an additional aspect of the present invention.

According to PNRP, when the node first comes up it discovers a neighbor. After it authenticates the neighbor, the node synchronizes its cache with the neighbor's cache. In accordance with the basic security methods of an embodiment of the present invention, the node verifies the certificate signature and validity for every address certificate it adds into the cache, but no ID ownership check is made for those advertised (but not owned) by the neighbor as discussed above with reference to FIG. 2. Thereafter, whenever a search request is received 244 the process of FIG. 3 is started 242. The node checks if the neighbor is already in the cache 220 at step 246. If it is, the node checks 248 if the time since it did the last ID ownership check exceeds the threshold 250. If it does or if the neighbor is not in the cache, the node performs a neighbor authentication 252 (the steps of which are illustrated in FIG. 2), adds the neighbor address certificate in the cache 236 (FIG. 2), and marks that the ID ownership check was performed 232 (FIG. 2). A check of the neighbor trustworthiness is also performed as illustrated in FIG. 2. If the trustworthiness of the neighbor is below the minimum accepted level, requests from that neighbor will not be accepted.

The node then gets the address certificate of the search request originator 254. If the neighbor is the search originator 256, the node skips the next step. If it is not, then the node verifies the validity of the originator's address certificate 258 (the step of which are illustrated in FIG. 2) and adds 236 it to the cache 220. It marks that no ID ownership of the certificate was performed 235 (FIG. 2) and the neighbor ID from which it learned about this ID. The node then compares its own ID to the ID searched at step 260. If the ID's match, it is returned 264 to the neighbor who requested it. If the node cannot find the requested ID 262, the node looks for a node to which it may forward the search 266. If the neighbor was recently authenticated 268, the node skips the authentication 272 and simply sends the request 270. If the neighbor was never authenticated or was authenticated too far in the past the node initiates the neighbor authentication procedure 272 as described above and illustrated in FIG. 2. If the authentication is valid 274, the request is forwarded at step 270 before ending 276. If the ID cannot be validated 274, another ID to which the node may forward the request is found 266.

Figure 4:
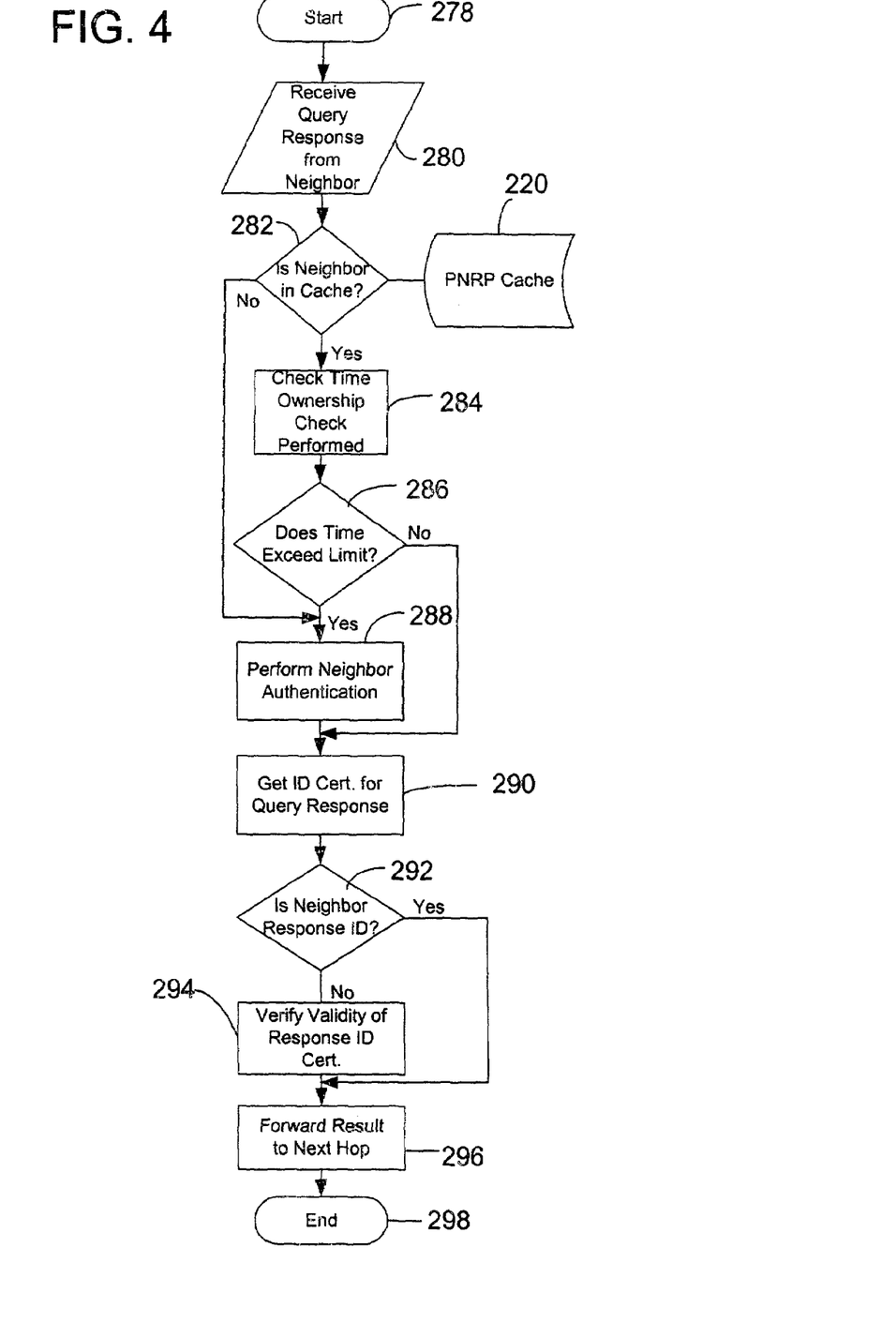
FIG. 4 is a simplified flow diagram illustrating yet an additional aspect of the present invention.

When the response from a query comes back 280, the process illustrated in FIG. 4 is started 278, the node checks the cache 220 to determine if the neighbor exists therein 282. If an entry for the neighbor is in the cache, the node checks the time that the ownership check was performed 284. If the time since an ownership check was performed exceeds a predetermined time 286, or if the neighbor is not in the cache as determined by step 282, the neighbor authentication 288 discussed above is performed. If the authentication is successful, the address certificate of the search result is then retrieved 290. If the neighbor is also the owner of the requested address certificate 292, then the result is forwarded to the next hop 296. If the neighbor is not the owner of the result, the validity of the response ID is verified 294 as illustrated in FIG. 2. The node then adds the result to the cache (as illustrated in FIG. 2) and forwards the response to the next hop 296, before ending 298. For the lowest level cache flooding process of PNRP, the same process as the startup discussed above with regard to FIG. 2 is utilized.

Every node maintains a per-ID (neighbor) trustworthiness metric. Every time an ID check is successful, the trustworthiness metric of the ID from which this record was learned is incremented. Every time the ID check fails, the trustworthiness metric of the ID from which this record was learned is decremented. Additionally, speed of responsiveness may also be used to rate neighbors. Such a combined metric may be thought of as a usefulness metric since it combines both trust and responsiveness. However, the term trustworthiness metric is used throughout to simplify the discussion.

In the security infrastructure of the present invention, this trustworthiness metric can be used in two ways. When the neighbor trustworthiness goes below a certain threshold, all the records for that neighbor are removed. The neighbor is kept in a negative cache and all the new advertisements from it will be refused. The records in the negative cache have a certain time to live (TTL), and after the TTL expires the ID history is cleaned. At this point, the neighbor is given a second chance. The second way that this trustworthiness metric is used is when selecting an ID for forwarding a search request. An ID from a more trusted neighbor is preferred to the one from a less trusted neighbor. The trustworthiness is a gray scale and not a black and white measurement. Stale entries in one node's cache could affect its trustworthiness because they would fail the ID check performed by any node. A BYE method as part of PNRP allows the reduction of the occurrence of this phenomenon by cleaning more aggressively stale entries in the cache.

A need for a PNRP address certificate revocation exists whenever the published address certificate becomes invalid prior to the certificate expiration date (Validity/To field). Examples of such events are when a node is gracefully disconnecting from the P2P network, or when a node is leaving a group, etc. The revocation mechanism of the present invention utilizes the publishing of a revocation certificate. A revocation certificate has the Revoke Flag set, and the From date of the Validity field set to the current time (or the time at which the certificate is to become revoked) and the To field set to the same value as the previously advertised certificates. All the certificates for which all the following conditions are met are considered to be revoked: the certificate is signed by the same issuer; the ID matches the ID in the revocation certificate; the Address fields match the ones in the revocation certificate; the To date of the Validation field is the same as the To date of the Validation filed in the revocation certificate; and the From date of the Validation field precedes the From date of the Validation filed in the revocation certificate.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of providing a security infrastructure for use in a peer-to-peer network without employing a single network wide certification authority or a network wide hierarchy of certification authorities, the method comprising at a first node:

receiving a record from a second node;

validating the ID certificate of the second node;

validating the expiration date of the ID certificate of the second node;

verifying ownership of the ID certificate at the second node's IP address if the second node is a neighbor of the first node;

managing a trustworthiness metric of a neighbor of the first node wherein for each neighbor of the first node, a separate trustworthiness metric is maintained; and limiting the number of records pointing to the same peer IP address to a percentage of the size of a cache.

2. The method of claim 1, wherein validating the ID certificate of the second node comprises of:

obtaining a public key P.sub.ID of the second node;

hashing the P.sub.ID;

comparing the hash of the P.sub.ID to an identity of the second node contained in the ID certificate; and decrementing the trustworthiness metric of the second node if the hash of the P.subID does not equal the identity of the second node contained in the ID certificate.

3. The method of claim 1, wherein validating the expiration date of the ID certificate of the second node comprises decrementing the trustworthiness metric of the second node if the expiration date has expired.

4. The method of claim 1, further comprising checking if the trustworthiness metric of the second node is below a predetermined level, and decrementing the trustworthiness metric of the second node if its trustworthiness metric is below the predetermined level.

5. The method of claim 1, wherein limiting the number of records pointing to the same peer IP address to a percentage of the size of a cache comprises determining if a number of entries in the cache that point to the IP address of the second node's ID certificate exceeds a predetermined limit and decrementing the trustworthiness metric of the second node if the number of entries exceeds the predetermined limit.

6. The method of claim 1, wherein verifying ownership of the ID certificate at the second node's IP address if the second node is a neighbor of the first node comprises:

determining that the second node is not an owner of the ID certificate and not a neighbor of the first node; and storing the second node's record in the cache along with an identification of the peer from whom the ID certificate was received.

7. The method of claim 1, wherein verifying ownership of the ID certificate at the second node's IP address if the second node is a neighbor of the first node comprises the steps of:

determining that the second node is an owner of the ID certificate and a neighbor of the first node;

encrypting a challenge with $P_{ID}$ to form an encrypted challenge;

sending the encrypted challenge to the IP address of the second node;

incrementing the trustworthiness metric of the second node, marking that ID ownership verification has been performed for the second node, and storing the second node's record in the cache if the challenge in decrypted form is received from the second node; and decrementing the trustworthiness metric of the second node if the challenge in decrypted form is not received from the second node.

8. A computer-readable medium having computer-executable instructions for performing the steps of claim 1.

9. A method of providing a security infrastructure for use in a peer-to-peer network without employing a single network wide certification authority or network wide hierarchy of certification authorities, the method comprising at a first node:
  A. receiving an address record from a second node, the record including an ID certificate;
  B. validating the ID certificate;
  C. verifying that the ID certificate has not expired;
  D. determining that the second node is to be trusted by checking the level of the trustworthiness metric for the second node;
  E. determining that the number of records in a cache for the second node is less than a predetermined limit; and
  F. when steps B. thru E. are completed successfully,
    a. selectively verifying ownership of the ID certificate at the second node's IP address;
    b. incrementing a trustworthiness metric for the second node if it is a neighbor of the first node;
    c. adding the second node's record to the cache; and
  G. when any of steps B. thru F. are not completed successfully, discarding the address record and decrementing the trustworthiness metric for the second node.

10. The method of claim 9, wherein step B. comprises the steps of:
  obtaining a public key $P_{ID}$ of the second node;
  hashing the $P_{ID}$;
  verifying that the hash of the $P_{ID}$ equals an identity of the second node contained in the ID certificate.

11. The method of claim 9, wherein step F. a. comprises the steps of:
  determining that is an owner of the ID certificate and a neighbor of the first node;
  encrypting a challenge with a public key $P_{ID}$ to form an encrypted challenge;
  sending the encrypted challenge to the IP address of the second node;
  receiving the challenge in decrypted form from the second node.

12. A computer-readable medium having computer-executable instructions for performing the steps of claim 9.

13. A method of processing a peer-to-peer query in a security infrastructure for use in a serverless peer to peer network wherein each individual peer node is authorized and able to certify only its own identity,
  the peer-to-peer query comprising a request from a neighbor node to a first node to find an owner of an identity contained in the query for purposes of verifying the identity,
  the method comprising:
  A. receiving the query containing the identity from a neighbor node at a first node;
  B. checking to see if a valid and verified record of the neighbor node is stored in a cache;
  C. when a valid and verified record of the neighbor node is not stored in the cache, or when a valid and verified record of the neighbor node is stored in the cache and a predetermined amount of time has passed since the last ownership check for the neighbor node,
    validating an ID certificate of the neighbor node and verifying ownership of the ID certificate at the neighbor node's IP address;
  D. when the neighbor node is not an originator of the query, validating an ID certificate of the originator;
  E. comparing the identity contained in the query to the identity of the first node;
  F. when the identity of the first node matches the identity contained in the query, returning the record of the first node to the neighbor node; and
  G. when the identity of the first node does not match the identity contained in the query, forwarding the query to a third peer node.

14. The method of claim 13 wherein the step of forwarding the query to a third peer node comprises the steps of:
  H. searching the cache to find a record for a suitable peer node to which to forward the query;
  I. determining if authentication of the record of the suitable peer node is valid;
  J. when authentication of the record of the suitable peer node is not valid, performing authentication of record; and
  K. when the authentication of the record is not successful, repeating steps H. thru J.

15. The method of claim 13, wherein validating an ID certificate of the neighbor node comprises:
  obtaining a public key $P_{ID}$ of the neighbor node;
  hashing the $P_{ID}$;
  comparing the hash of the $P_{ID}$ to an identity of the neighbor node contained in the ID certificate; and
  decrementing a trustworthiness metric of the neighbor node if the hash of the $P_{ID}$ does not equal the identity of the neighbor node contained in the ID certificate.

16. The method of claim 13, wherein verifying the ownership of the ID certificate at the IP address of the neighbor node comprises:
  encrypting a challenge with a public key $P_{ID}$ of the neighbor node to form an encrypted challenge;
  sending the encrypted challenge to the IP address of the neighbor node;
  incrementing the trustworthiness metric of the neighbor node, marking that ID ownership verification has been performed for the neighbor node, and storing the neighbor node's record in the cache if the challenge in decrypted form is received from the neighbor node; and
  decrementing the trustworthiness metric of the neighbor node if the challenge in decrypted form is not received from the neighbor node.

17. The method of claim 13, wherein the step of validating an ID certificate of the originator node comprises the steps of:
  obtaining a public key $P_{ID}$ of the originator node;
  hashing the $P_{ID}$ of the originator node; comparing the hash of the $P_{ID}$ an identity of the originator node contained in the ID certificate; and decrementing the trustworthiness metric of the neighbor node if the challenge in decrypted form is not received from the neighbor node.

18. A computer-readable medium having computer-executable instructions for performing the steps of claim 13.

19. A method of processing a response to a peer-to-peer query in a security infrastructure for use in a serverless peer to peer network wherein each individual peer node is authorized and able to certify only its own identity, the peer-to-peer query comprising a request from a first node to a neighbor node to find an owner of an identity contained in the query for purposes of verifying the identity, the method comprising at the first node:
A. receiving the response from the neighbor node, the response comprising a result and a next hop node;
B. checking to see if a valid and verified record of the neighbor node is stored in a cache;
C. when a valid and verified record of the neighbor node is not stored in the cache, or when a valid and verified record of the neighbor node is stored in the cache and a predetermined amount of time has passed since the last ownership check for the neighbor node,
validating an ID certificate of the neighbor node and verifying ownership of the ID certificate at the neighbor node's IP address;
D. when the neighbor node is not the result of the query, validating an ID certificate of the result; and
E. when the ID certificate of the result is validated, forwarding the result to the next hop node identified in the response.

20. The method of claim 19, wherein validating an ID certificate of the neighbor node comprises:
obtaining a public key $P_{ID}$ of the neighbor node;
hashing the $P_{ID}$;
comparing the hash of the $P_{ID}$ to an identity of the neighbor node contained in the ID certificate, and
decrementing a trustworthiness metric of the neighbor node if the hash of the $P_{subID}$ does not equal the identity of the neighbor node contained in the ID certificate.

21. The method of claim 19, wherein verifying ownership of the ID certificate at the neighbor node's IP address comprises:
encrypting a challenge with a public key $P_{ID}$ of the neighbor node to form an encrypted challenge;
sending the encrypted challenge to the IP address of the neighbor node;
incrementing the trustworthiness metric of the neighbor node, marking that ID ownership verification has been performed for the neighbor node, and storing the neighbor node's record in the cache if the challenge in decrypted form is received from the neighbor node; and
decrementing the trustworthiness metric of the neighbor node if the challenge in decrypted form is not received from the neighbor node.

22. The method of claim 19, wherein the step of validating an ID certificate of the result comprises:
obtaining a public key $P_{ID}$ of the result;
hashing the $P_{ID}$;
verifying that the hash of the $P_{ID}$ equals an identity of the result contained in the ID certificate.

23. A computer-readable medium having computer-executable instructions for performing the steps of claim 19.

24. The method of claim 1, wherein managing the trustworthiness metric of a neighbor of the first node comprises at least one of: incrementing the neighbor's trustworthiness metric when the ownership of the ID certificate at the neighbor is verified;
decrementing the neighbor's trustworthiness metric when the ownership of the ID certificate at the neighbor fails to be verified;
decrementing the neighbor's trustworthiness metric when ownership of the ID certificate at the neighbor node is not verified within a predetermined time limit;
decrementing the neighbor's trustworthiness metric when the neighbor sends a record signed by a third node, and the ownership of the ID certificate at the third node fails to be verified;
decrementing the neighbor's trustworthiness metric when the number of records pointing to the neighbor's peer IP address exceeds a percentage of the size of the cache; and
deleting all records in the cache for the neighbor if the neighbor's trustworthiness metric falls below a predetermined level and refusing new advertisements from the neighbor until a predetermined time limit has expired.

* * * * *